United States Patent [19]

Shekleton

[11] Patent Number: 4,936,090
[45] Date of Patent: Jun. 26, 1990

[54] ASSURING RELIABLE STARTING OF TURBINE ENGINES

[75] Inventor: Jack R. Shekleton, San Diego, Calif.

[73] Assignee: Sundstrand Corporation, Rockford, Ill.

[21] Appl. No.: 219,235

[22] Filed: Jul. 15, 1988

[51] Int. Cl.⁵ .............................................. F02C 7/26
[52] U.S. Cl. ............................... 60/39.141; 60/39.36; 60/746; 60/755; 60/760
[58] Field of Search ............ 60/39.06, 39.141, 39.142, 60/39.36, 739, 746, 755, 759, 760, 39.827

[56] References Cited

U.S. PATENT DOCUMENTS

| | | |
|---|---|---|
| 2,613,998 | 10/1952 | Noon et al. . |
| 2,635,423 | 4/1953 | Akes et al. . |
| 2,701,164 | 2/1955 | Purchas, Jr. et al. . |
| 3,335,567 | 8/1967 | Hemsworth .......................... 60/739 |
| 3,548,565 | 12/1970 | Toesca ............................. 60/39.36 |
| 3,630,024 | 12/1971 | Hopkins . |
| 4,062,183 | 12/1977 | Davies et al. .................... 60/39.141 |
| 4,327,547 | 5/1982 | Hughes et al. . |
| 4,417,439 | 11/1983 | Sepulveda et al. .............. 60/39.141 |
| 4,549,402 | 10/1985 | Saintsbury et al. .................. 60/760 |
| 4,674,286 | 6/1987 | Thatcher et al. . |
| 4,794,754 | 1/1989 | Shekleton et al. ................. 60/39.36 |
| 4,815,277 | 3/1989 | Vershure, Jr. et al. .......... 60/39.142 |
| 4,817,389 | 4/1989 | Holladay et al. ..................... 60/746 |

FOREIGN PATENT DOCUMENTS 132729  6/1986  Japan ..................................... 60/739

Primary Examiner—Donald E. Stout
Attorney, Agent, or Firm—Wood, Phillips, Mason, Recktenwald & VanSanten

[57] ABSTRACT

Reliable starting of air breathing turbines even at high altitude is assured in a turbine engine of the type including an annular combustor 26 by locating one or more start injectors 96 away from the bottom of the combustor 26 and making the bottom of the combustor 26 free of start injector 96.

4 Claims, 2 Drawing Sheets

ASSURING RELIABLE STARTING OF TURBINE ENGINES

FIELD OF THE INVENTION

This invention relates to air breathing turbine engines, and more particularly, to an improved means for assuring reliable starting of such engines.

BACKGROUND OF THE INVENTION

Air breathing turbine engines typically include, as major components, a turbine wheel coupled to a rotary compressor. A combustor receives compressed air from the compressor as well as fuel from a fuel source and burns the same to provide hot gases of combustion to drive the turbine wheel.

Many such systems employ so-called "annular" combustors which typically include a somewhat toroidal-shaped combustion chamber centered about the rotational axis of the turbine wheel and there are provided a plurality of circumferentially or angularly spaced fuel injectors which inject fuel into the annular combustion space. In the usual case, the injectors are of two different types. One type is a so-called "main" injector which is utilized during normal operation. The other type is a so-called "start" injector which is utilized only during the starting sequence for the turbine.

Generally speaking, the start injectors are configured to provide for good atomization of the fuel by means of pressure atomization because at start up, the velocity of compressed air received from the compressor is relatively low and cannot be relied upon to enhance atomization.

Frequently, to achieve the enhanced atomization of fuel that is required at low engine rotational speeds, relatively high volumes of fuel are pumped through the start injectors. However, this may result in local overfueling which in turn causes combustion inefficiencies and hot streaks or hot spots which can damage the combustor.

This difficulty may be exacerbated when it is necessary to start the turbine at high altitude. In such a case, the effect of so-called "altitude head" causes fuel flow at the bottom of a manifold feeding the injectors to be significantly greater than fuel flow at the top of the manifold. This results in hot spot generation near the bottom of the annular combustor where start injectors are frequently located as well as poor flame propagation around the annular combustor to the top thereof. Consequently, not only must one face the difficulty of hot spots, starting is not as reliable as may be desired because of poor flame propagation.

The present invention is directed to overcoming one or more of the above problems.

SUMMARY OF THE INVENTION

It is the principal object of the invention to provide a new and improved turbine engine. More particularly, it is an object of the invention to provide a turbine engine that may be started reliably without either the formation of hot spots or poor flame propagation at altitude, or both.

An exemplary embodiment of the invention achieves the foregoing objects in a turbine engine including a rotary compressor, a turbine wheel coupled to the compressor and mounted for rotation about an axis, and an annular nozzle surrounding the turbine wheel for directing gas thereat. An annular combustor is generally concentric with the axis and has an outlet connected to the nozzle. The combustor has a top and a bottom. A compressed air plenum substantially surrounds the combustor and is connected to the compressor and there are provided a plurality of angularly spaced main fuel injectors, each having an outlet within the combustor, for injecting fuel thereinto in a generally circumferential direction. Means are provided that are in fluid communication with the plenum for directing compressed air into the combustor in a generally circumferentially direction and there is provided at least one pressure atomizing start fuel injector having an outlet within the combustor well above the bottom, the bottom being free of start injectors to prevent the formation of hot spots within the combustor.

As a result of the foregoing, a swirling circumferential air flow is generated within the combustor to provide excellent flame propagation and the location or the start injector well above the bottom and the fact that there are no start injectors at the bottom, prevent the formation of hot spots.

In a highly preferred embodiment, the injector is located more nearly midway between the top and the bottom than near the top or the bottom of the combustor.

In one embodiment of the invention, there are two of the start injectors at diametrically opposite locations with one being lower than the other. The lower injector is spaced from the bottom in the generally circumferential direction in which compressed air is directed into the chamber.

Preferably, where there are two diametrically opposite start injectors, they are located in a plane that is more nearly horizontal than vertical.

Other objects and advantages will become apparent from the following specification taken in connection with the accompanying drawings.

DESCRIPTION OF THE PREFERRED EMBODIMENT

Figure 1:
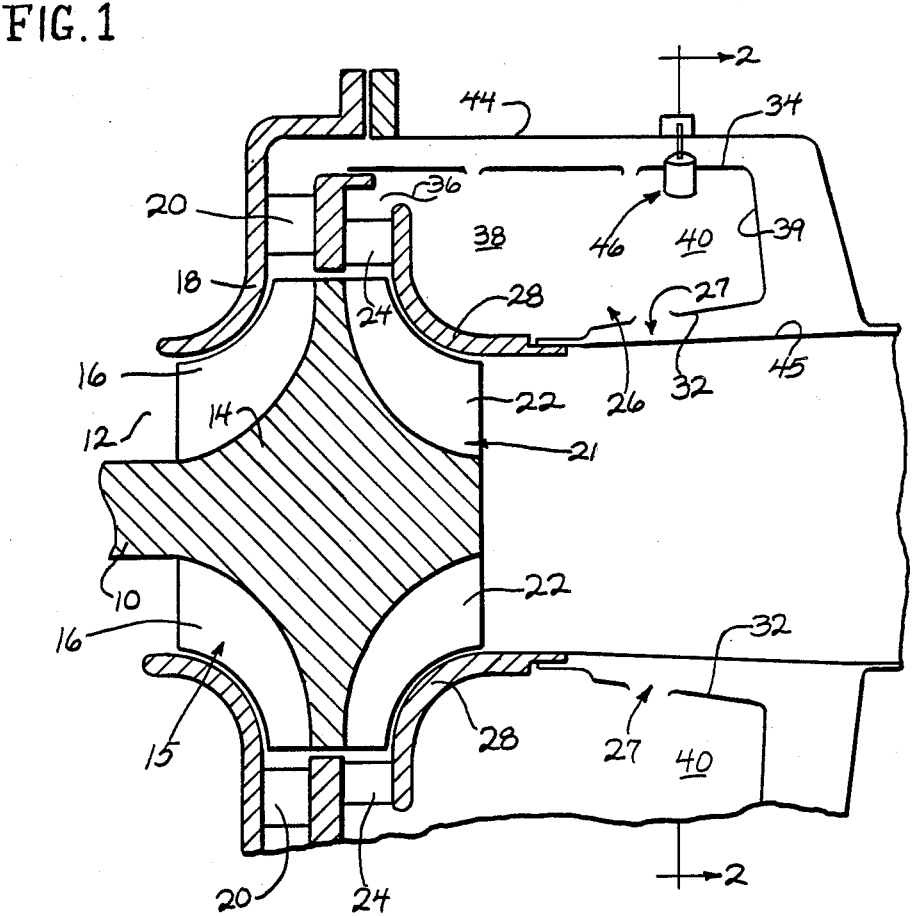
FIG. 1 is a somewhat schematic, sectional view of a turbine engine made according to the invention.

An exemplary embodiment of a gas turbine made according to the invention is illustrated in the drawings in the form of a radial flow, air breathing gas turbine. However, the invention is not limited to radial flow turbines and may have applicability to any form of air breathing turbine having an annular combustor.

The turbine includes a rotary shaft 10 journaled by bearings not shown. Adjacent one end of the shaft 10 is an inlet area 12. The shaft 10 mounts a rotor generally designated 14, which may be of conventional construction. Accordingly, the same includes a compressor section, generally designated 15, including a plurality of compressor blades 16 adjacent the inlet 12. A compressor shroud 18 is provided in adjacency thereto and just radially outwardly of the radially outer extremities of the compressor blades 16 is a conventional diffuser 20.

Oppositely of the compressor blades 16, the rotor 14 includes a turbine wheel, generally designated 21, including a plurality of turbine blades 22. Just radially outwardly of the turbine blades 22 is an annular nozzle 24 which is adapted to receive hot gases of combustion along with a dilution air, from an annular combustor, generally designated 26. The compressor 15 including the blades 16, the shroud 18, and the diffuser 20 delivers compressed air to the annular combustor 26, and via dilution air passages 27, to the nozzle 24 along with the gases of combustion. That is to say, hot gases of combustion from the combustor 26 are directed via the nozzle 24 against the blades 22 to cause rotation of the rotor 14 and thus the shaft 10. The latter may be, of course, coupled to some sort of apparatus requiring the performance of useful work.

A turbine blade shroud 28 is interfitted with the combustor 26 to close off the flow path from the nozzle 24 and confine the expanding gas to the area of the turbine blades 22. The combustor 26 has a generally cylindrical inner wall 32, and a generally cylindrical outer wall 34. The two are concentric with each other and with the rotational axis of the shaft 10 and merge to a necked down area 36 which serves as an outlet from an interior annulus 38 defined by the space between the walls 32 and 34 of the combustor 26. Such outlet 36 extends to the nozzle 24. A third wall 39, generally concentric with the walls 32 and 34, extends generally radially to interconnect the walls 32 and 34 and to further define the annulus 38.

Opposite of the outlet 36 and adjacent the wall 39, the interior annulus 38 of the combustor includes a primary combustion zone 40 in which the burning of fuel primarily occurs. The primary combustion zone 40 is an annulus or annular space defined by the generally radially inner wall 32, the generally radial outer wall 34, and the radial wall 39. Other combustion may, in some instances, occur downstream from the primary combustion zone 40 in the direction of the outlet 36. As mentioned earlier, provision is made for the injection of dilution air through the passages 27 into the combustor 26 to cool the gases of combustion to a temperature suitable for application to the turbine blades 22 via the nozzle 24.

A further annular wall 44 is generally concentric to the walls 32 and 34 and is located radially outward of the latter. Similarly, an inner annular wall 45 inside the wall 32 is provided and together with the wall 44 provides a plenum surrounding the combustor 46. The wall 44 extends to the outlet of the diffuser 20 and thus serves to contain and direct compressed air from the compressor system to the combustor 26.

Figure 3:
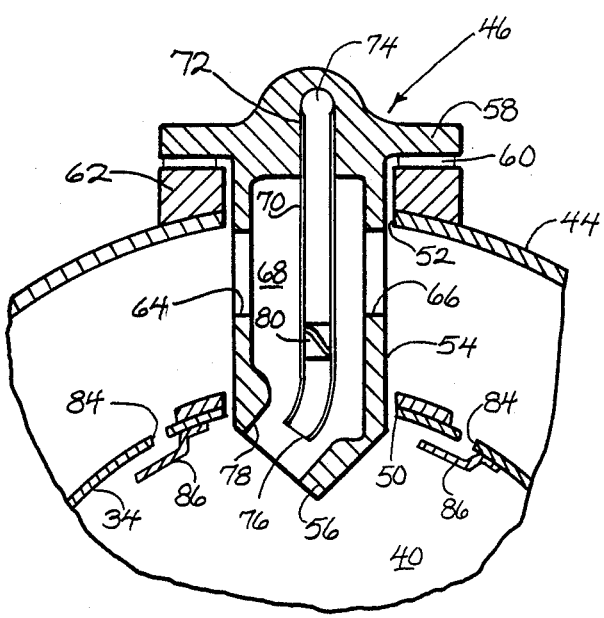
FIG. 3 is a fragmentary sectional view of a fuel injector and a combustor made according to the invention.
Figure 2:
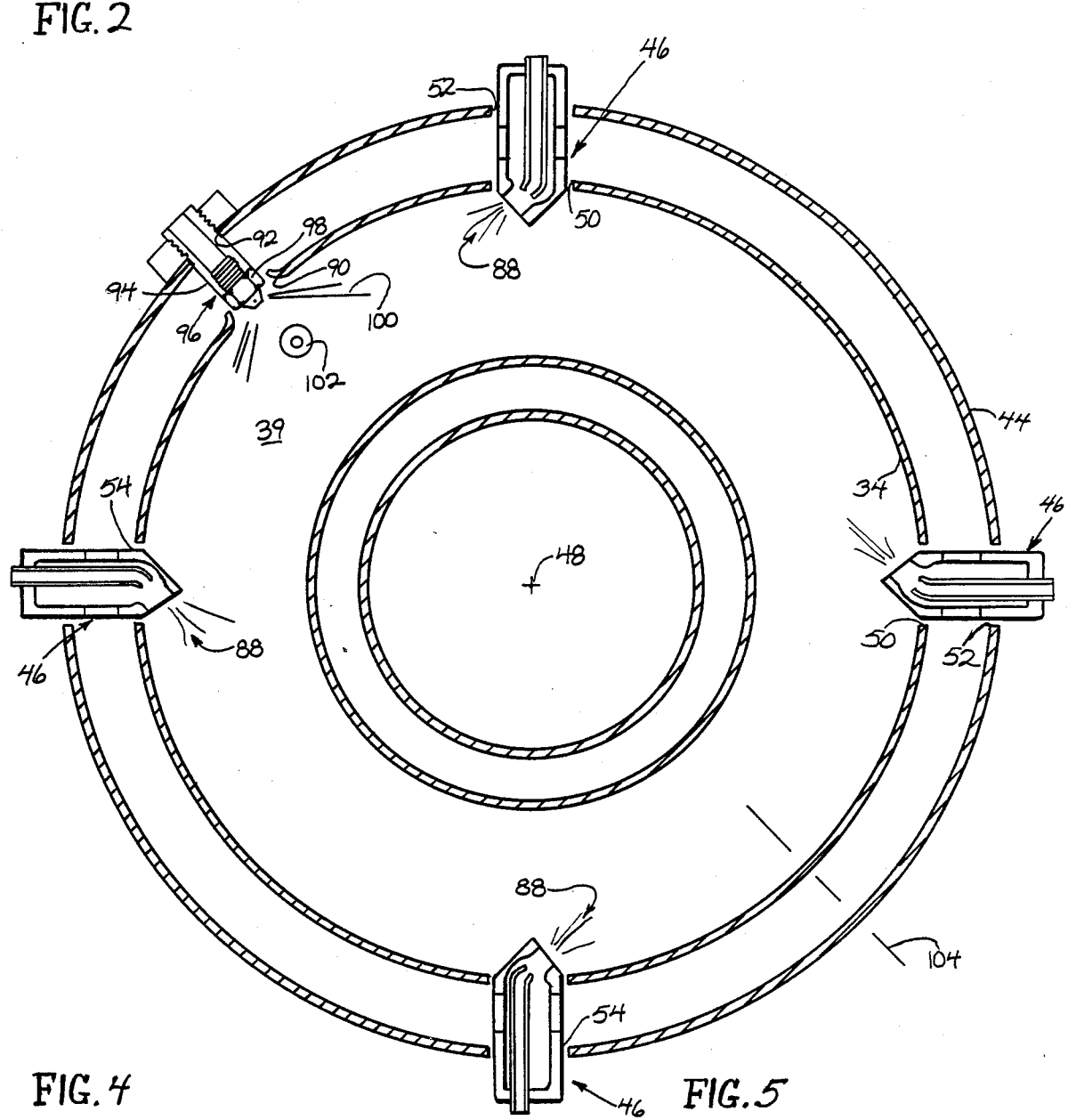
FIG. 2 is an enlarged, sectional view taken approximately along the line 2—2 in FIG. 1.

Mounted on the wall 44, and extending through the wall 34, are main fuel injectors, generally designated 46. As seen in FIG. 2, according to a preferred embodiment of the invention, there are four of the injectors 46 equally angularly spaced about the axis of rotation of the shaft 10 which is designated by a point 48. The injectors 46 are designated A, B, C and D about the combustor 26 in the clockwise direction with the injector A being at the top of the combustor and the injector C being at the bottom of the combustor. As seen in FIGS. 2 and 3, the injectors 46 extend into the primary combustion zone 40 by means of aligned apertures 50 and 52 respectively formed in the walls 34 and 44. Each injector 46 includes a generally cylindrical housing 54 terminating in a radially inward elbow section 56. Oppositely the elbow section 56, the housing 54 has a peripheral retaining flange 58 (shown in FIG. 3 only) which may be sealed by a gasket 60 against the mounting surface on the exterior of the radially outer plenum wall 44.

That part of the housing 54 disposed between the walls 34 and 44 is provided with one or more openings 64, 66 which open to the plenum defined by the walls 34 and 44. Thus, compressed air from the compressor 15 may flow through the openings 64, 66 to the interior 68 of each fuel injector housing 54.

Within the the interior 68 of each housing 54 there is disposed a somewhat J-shaped tube 70. The radially outer end 72 of the tube 70 is in fluid communicating with the fuel manifold 74 while the radially inner end 76 is angled to correspond with the elbow section 56 of the fuel injector housing 54 and to be centered about a reduced diameter opening 78 therein. Preferably a fuel swirler 80 may be located within the tube 70 in proximity to the end 76 which serves as an injector nozzle.

The angle of the elbow section 56 and the end 78 of the tube 70 is such that both fuel and air will enter the primary combustion zone generally tangentially as indicated schematically by the circumferentially extending spray pattern 84 shown in FIG. 2. Provision may also be made for the introduction of dilution air into the periphery of the primary combustion zone 40 in a circumferential, tangential direction by the provision of a series of axial lines of apertures 84 and axially elongated cooling strips 86 as illustrated in FIG. 3. Similar apertures and cooling strips (not shown) for tangential and/or circumferential dilution or cooling air injection may also be located on the wall 32 and the radial wall 39.

The tangential injection of fuel and combustion air via the injectors 46 as well as tangential introduction of dilution and/or cooling air as just described provides for a high degree of circumferential swirl within the primary combustion zone 40. The same is highly desirable since such provides for excellent flame propagation.

Extending through aligned openings 90 and 92 in the walls 34 and 44 respectively at a location slightly above the injector D and closer to that injector than to the injector A is the barrel 94 of a start injector, generally designated 96. The start injector 96 is of the pressure atomization sort and includes an atomization nozzle 98 located to provide the spray pattern 100. Mounted in the radial wall 39 in proximity to the spray pattern 100 is a high energy igniter 102 of conventional construction.

Those skilled in the art will recognize that a pressure atomization injector such as the start injector 96 relies on pressure of the fuel applied interiorly of the nozzle 98 to achieve fuel atomization through the nozzle rather than atomization as a result of injecting fuel into a high velocity air stream as is the principal means of atomization with the nozzles 46.

Figure 4:
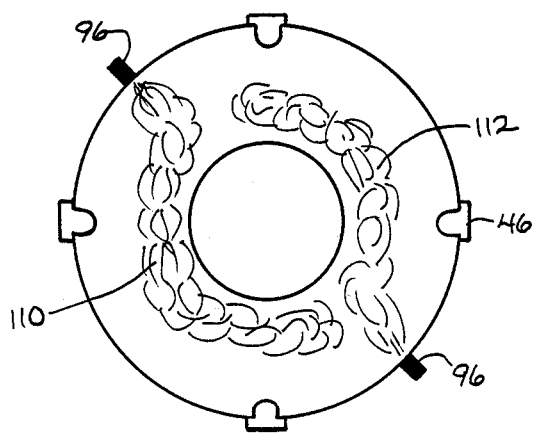
FIG. 4 is a schematic view illustrating flame propagation in one form of a combustor made according to the invention.

In some instances, but a single one of the injectors 96 is employed. In others, however, a diametrically opposite, otherwise identical injectors 96 may be provided as schematically illustrated in FIG. 4 and at the location designated 104 in FIG. 2. Such a location of course means that the second start injector 96 will be closer to the main fuel injector B than to the main fuel injector C. It also means that either start injector 96 is located more nearly midway between the top and the bottom of the combustor 26 than to the top or the bottom and similarly means when two diametrically opposed start injectors 96 are utilized, they are in a plane that is more nearly horizontal than vertical. Generally speaking, it is desirable that such plane be as nearly horizontal as is possible. In the embodiment illustrated, an absolutely horizontal disposition is not possible because such a position is occupied by the main fuel injectors B and D.

It is also noted that neither of the start injectors 96 are located at the bottom of the combustor, which is free from start injectors. It is further observed that the lowermost start injector is spaced from bottom in the direction of air injection. This means that fuel being injected from the lowermost start injector 96 will tend to be blown upwardly within the annular space between the walls 32 and 34.

FIG. 4 illustrates the resulting pattern of flame as a result of fuel being injected by the start injectors 96. The flame pattern resulting from injection at the left hand start injector 96 is designated 110 while that emanating from the right hand injector 96 is designated 112. It will be seen that the circumferential swirl provides a good distribution of flame about the annular space to prevent the formation of hot spots and that the particular location of the injectors 96 minimizes any deleterious effect of altitude head.

Figure 5:
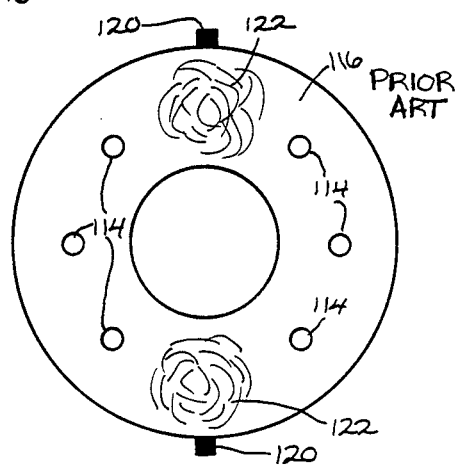
FIG. 5 is a view similar to FIG. 4 but of a prior art combustor.

This is in contrast to many typical combustors such as that shown in FIG. 5. There, main fuel injectors are designated 114 and inject axially of an annulus 116 that corresponds roughly to the annulus 38. Start injectors 120 inject anxially and generate flame patterns 122 as generally illustrated and it will be appreciate that the areas containing the two flame patterns 122 are much hotter than the remaining areas about the combustor. Thus, engine life shortening hot spots are clearly present.

It should be further appreciated, however, that the illustration in FIG. 5 does not take into account the additional difficulty that will occur during a high altitude start as a result of the effect of altitude head. In such a case, the upper flame patterns would be substantially reduced in size because of much greater fuel flow through the lower injectors than through the upper injectors. Stated another way, the flame pattern would be basically at the bottom of the combustor with extremely poor flame propagation that could interfere with reliable starts.

It will therefore be appreciated that a turbine engine made according to the invention assures reliable starting of turbine engines without the generation of hot spots and provides excellent flame propagation to assure reliable starting even at high altitude by substantially eliminating the effects of altitude head.

What is claimed:

1. A turbine engine comprising:
a rotary compressor;
a turbine wheel coupled to said compressor and mounted for rotation about an axis;
an annular nozzle surrounding said turbine wheel for directing gas thereat;
an annular combustor generally concentric with said axis and having an outlet connected to said nozzle, said combustor having a top, a midpoint and a bottom;
a compressed air plenum substantially surrounding said combustor and connected to said compressor;
a plurality of angularly spaced, main fuel injectors, each having an outlet within said combustor for injecting fuel thereinto in a generally circumferential direction;
means in fluid communication with said plenum for directing compressed air into said combustor in a generally circumferential direction; and
at least one pressure atomizing start fuel injector having an outlet within said combustor well above said midpoint, said bottom being free of start injectors to prevent the formation of hot spots within said combustor.

2. A turbine engine comprising:
a rotary compressor;
a turbine wheel coupled to said compressor and mounted for rotation about an axis;
an annular nozzle surrounding said turbine wheel for directing gas thereat;
an annular combustor generally concentric with said axis and having an outlet connected to said nozzle, said combustor having a top and a bottom;
a compressed air plenum substantially surrounding said combustor and connected to said compressor;
a plurality of angularly spaced, main fuel injectors, each having an outlet within said combustor for injecting fuel thereinto in a generally circumferential direction;
means in fluid communication with said plenum for directing compressed air into said combustor in a generally circumferential direction; and
two pressure atomizing start fuel injectors at diametrically opposite locations with one being lower than the other, said lower injector being spaced from said bottom in the generally circumferential direction in which compressed air is directed into said combustor, said bottom being free of start injectors to prevent the formation of hot spots within said combustor.

3. A turbine engine comprising:
a rotary compressor;
a turbine wheel coupled to said compressor and mounted for rotation about an axis;
an annular nozzle surrounding said turbine wheel for directing gas thereat;
an annular combustor having radially inner and outer walls generally concentric with said axis with a space therebetween and having an outlet connected to said nozzle, said combustor having a top and a bottom;
a compressed air plenum substantially surrounding said combustor and connected to said compressor;
a plurality of angularly spaced, main fuel injectors, each having an outlet within said combustor for injecting fuel and air thereinto in a generally circumferential direction and tangentially to said space;
means in fluid communication with said plenum for directing compressed air into said combustor in a generally circumferential direction; and
at least one pressure atomizing start fuel injector having an outlet within said combustor well above said bottom and spaced from said bottom in the generally circumferential direction in which compressed air is directed into said combustor, said bottom being free of start injectors to prevent the formation of hot spots within said combustor.

4. A turbine engine comprising:
a rotary compressor;
a turbine wheel coupled to said compressor and mounted for rotation about an axis;
an annular nozzle surrounding said turbine wheel for directing gas thereat;

an annular combustor generally concentric with said axis and having an outlet connected to said nozzle, said combustor having a top and a bottom;

a compressed air plenum substantially surrounding said combustor and connected to said compressor;

a plurality of angularly spaced, main fuel injectors, each having an outlet within said combustor for injecting fuel thereinto in a generally circumferential direction;

means in fluid communication with said plenum for directing compressed air into said combustor in a generally circumferential direction; and at least one pressure atomizing start fuel injector having an outlet within said combustor and being located between said top and said bottom and spaced from said bottom in the generally circumferential direction in which compressed air is directed into said combustor, said bottom being free of start injectors to prevent the formation of hot spots within said combustor.

* * * * *